Inventor
Carl Schnell
by W. Bartlett Jones,
Attorney 3,019,067
COMMINUTING MACHINE
Carl Schnell, Winterbach, near Schorndorf, Württemberg, Germany, assignor of one-half to The Griffith Laboratories, Inc., Chicago, Ill., a corporation of Illinois
Filed Mar. 10, 1959, Ser. No. 798,454
2 Claims. (Cl. 308—189)

The invention relates to machines such as comminuting devices for agricultural products, particularly meat, which are provided with a rotor having cutting arms rotating over a foraminous plate and propelled by a power shaft mounted in an axially displaceable hollow screw. Particularly in the processing of meat, a very high speed of rotation of the cutting rotor is required. Such high speed requires a dependable positioning of all rotating parts, because the slightest imperfections manifest themselves in an extremely unfavorable vibration of the entire machine, wearing out the bearings and otherwise damaging parts. In the prior art machines, the hollow screw which mounts the power shaft is located in a threaded portion fixed to the machine frame. In order to effect a slight adjustment, the threaded parts must not have too great a friction between them. On the other hand, too much play is undesirable, thereby resulting in said vibration of the cutting rotor and eventually of the entire machine.

In order to equalize production tolerances, and particularly, to make possible a readjustment due to wear of the parts, according to the present invention the hollow screw is arranged in a resilient casing mounted in the machine frame and provided with internal threads. Because of a permissible adjustability of the resilient casing, it is possible to effect a favorable setting of the threaded parts with reference to each other, so that the rotating shaft has no play, whereby vibration is completely avoided.

According to one characteristic of the invention, the resilient casing has a slot transverse to the axis of the casing and extending approximately to it. A second slot at right angles to the first divides one part of the casing over the transverse slot into two arms of about 90° extent, approximately half of a split ring, the remainder of the casing being fixed relative to the frame and including at one side of the transverse slot a closed ring. An additional means is provided for enlarging and ensmalling the split ring with said arms functioning as clamping members. As a result of this structure, a dependable fit of the resilient casing and hollow screw is effected inside the machine in addition to permitting easy adjustment of the shaft axially.

The drawings show an embodiment of the invention, in which.

Figure 1:
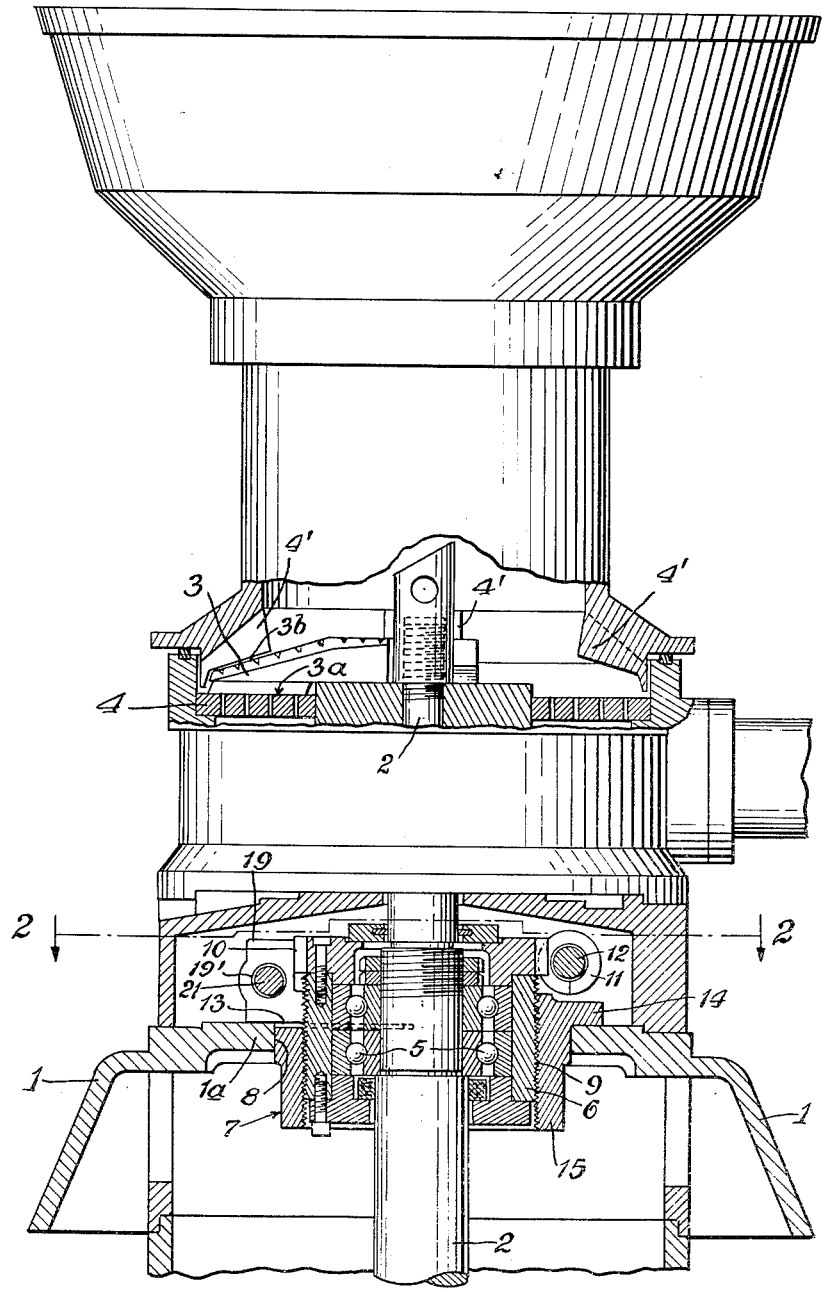
FIG. 1 shows a machine partly in elevation and partly in cross-section on the line 1—1 of FIG. 2, the bottom being broken off.

The machine shown in the drawings is generally similar to that illustrated and described in my U.S. Patent No. 2,842,177. It has a frame 1, with a power shaft 2 suitably driven as by a motor (not shown). The shaft 2 carries on its upper end a cutting rotor with cutting arms 3 of which only one is visible in FIG. 1 of which each arm rotates with a trailing cutting edge 3a over and in contact with a foraminous plate 4, and with a leading knife-edge 3b which is preferably in shearing relation with lugs 4' located to obstruct circulating material.

The power shaft 2 and thus cutting arms 3 are adjustable axially. For this purpose the shaft 2 is mounted by means of ball bearings 5 in a hollow screw 6, and the hollow screw 6 is threaded into an adjustable resilient casing 7. Casing 7 is located in a circular recess 8 in the machine frame 1, and has internal threads 9.

Figure 2:
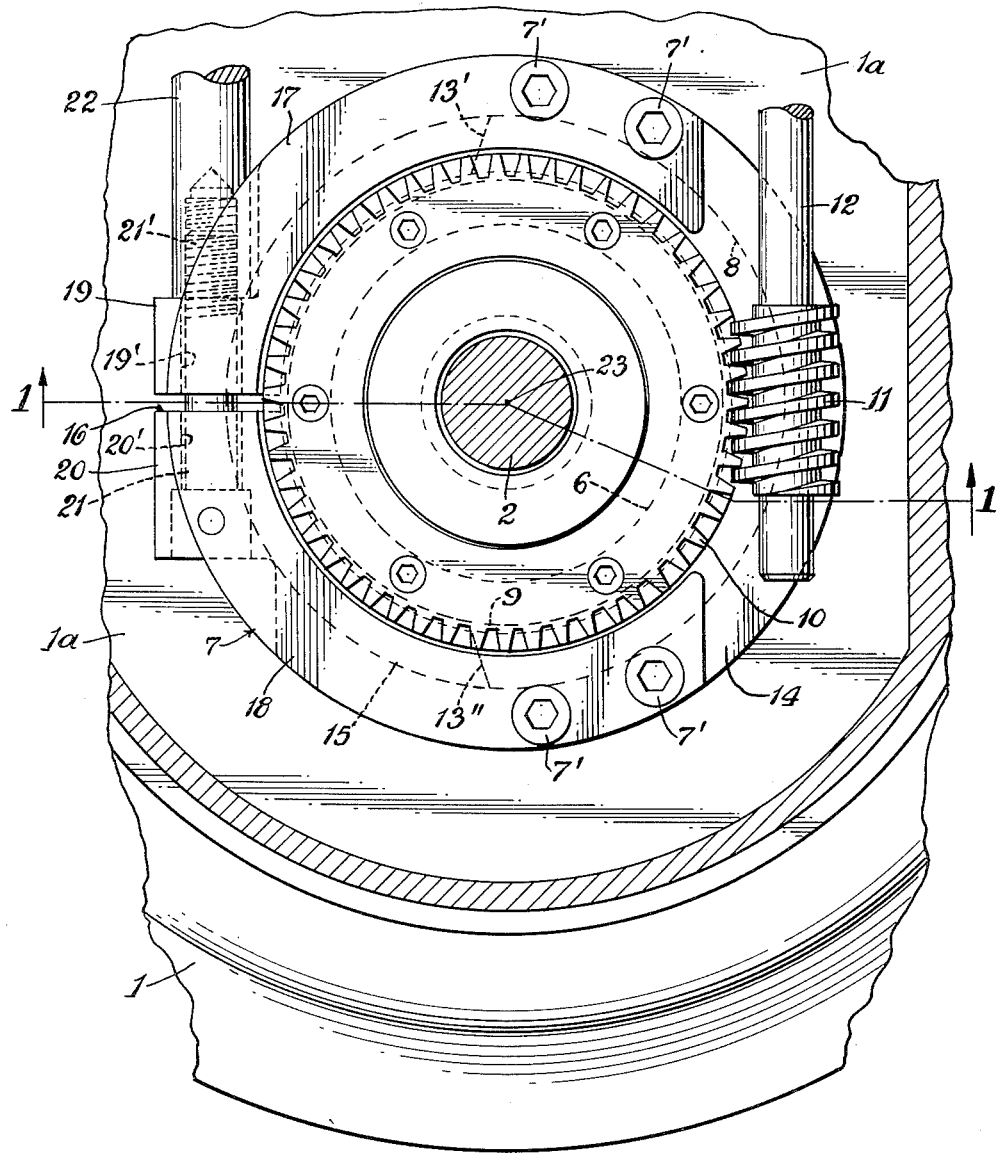
FIG. 2 shows an enlarged view in horizontal section taken at the line 2—2 in FIG. 1.

For adjustment purposes the hollow screw 6 is provided with a worm gear 10 meshing with worm 11, on shaft 12, which is turned from outside the machine. The casing 7 is secured in the recess 8 to frame 1 by bolts 7' all located in FIG. 2 to the right of the axis of shaft 2. In FIG. 1, the part 14 of casing 7 which lies above the flange 1a of the frame 1 is severed from the part within said flange by a transverse slot 13 extending nearly to the axis 23, the dotted lines 13' and 13" being the bottoms of the slot.

The lower part 15 of the casing provides an internally threaded closed ring fixed to the frame 1. The upper part 14 has a vertical slot 16 dividing it into a split ring such that slot 16 and slot 13 provide two resilient clamping arms 17 and 18 substantially 90° in extent which arms form a split ring, half of which is fixed by said bolts 7' to the frame 1. Arms 17 and 18 at their free ends have spaced apart lateral extensions 19 and 20, with alined horizontal holes 19' and 20' therein.

A threaded bolt 21 passes through said holes 19' and 20', being fixed in extension 20 and being slidable in the hole 19' of extension 19 with its threaded end 21' extending beyond extension 19. Said threaded end 21' is engaged in a threaded socket in the end of an adjusting rod 22, shown cut off. By turning rod 22 to draw in the bolt 21, the rod's threaded end forces extension 19 toward extension 20, tending to close the vertical slot 16, thus to tighten the clamping arms 17 and 18 about the hollow screw 6. Looseness in the adjustable shaft-mounting and resulting vibration are thus eliminated.

The illustrated type of mounting for effecting axial adjustment of a shaft is useful in a variety of machines, such as colloidal mills and disk grinders, wherein slight adjustments are important to the function of the machine. Accordingly, the present invention is not to be considered as limited to or by the machine illustrated in the drawings.

In the structure of my prior Patent No. 2,842,177, the corresponding threaded engagement of the parts must be tight in order to avoid looseness and vibration. This calls for close tolerances in machining the threads. This makes the adjustment more difficult to effect manually and induces wear, thereby leading to a looser engagement and vibration as the machine ages in use.

By reason of the present invention close tolerances in machining the threads are not required, and resulting looseness can be minimized or eliminated. By tightening the split ring to its limit, it is eliminated, and the manual adjustment is made difficult to impossible during operation. By incompletely tightening the split ring to its limit, the degree of friction or play in the threaded engagement encountered during adjustment may be lessened and thus controlled.

I claim:

1. In a machine having a frame and a shaft axially adjustable with reference to the frame, means for adjustably mounting the shaft comprising an internally threaded casing having a slot therein transverse to its axis and extending inwardly to the vicinity of the axis, one portion on one side of said slot being fixedly positioned in the machine frame, the remaining portion having a slot substantially at right angles to the first slot dividing the remaining portion of the casing into a split ring having two arms movable relative to each other and to the frame, a hollow screw threaded into said casing and rotatably mounting said shaft in axially fixed relation thereto, second means for adjustably rotating the hollow screw within said casing axially to adjust the shaft, and third means connecting with said two arms of said split ring to vary the opening in said split-ring portion whereby to loosen and tighten the threaded engagement between said hollow screw and said casing.

2. A machine according to claim 1 in which the ends of the split-ring portion have lateral extensions parallel to each other, and threaded means forming part of said third means and operatively related to said extensions for predetermining the extent of opening of said split-ring portion.

References Cited in the file of this patent

UNITED STATES PATENTS

| 1,781,467 | Madsen | Nov. 11, 1930 |
| 2,355,723 | Griffin | Aug. 15, 1944 |
| 2,496,359 | Rymann | Feb. 7, 1950 |

FOREIGN PATENTS

| 315,809 | Switzerland | Oct. 31, 1956 |